United States Patent
Moisin

[11] Patent Number: 6,100,645
[45] Date of Patent: Aug. 8, 2000

[54] BALLAST HAVING A REACTIVE FEEDBACK CIRCUIT

[75] Inventor: Mihail S. Moisin, Brookline, Mass.

[73] Assignee: Electro-Mag International, Inc.

[21] Appl. No.: 09/215,070

[22] Filed: Dec. 18, 1998

Related U.S. Application Data

[63] Continuation-in-part of application No. 09/102,789, Jun. 23, 1998.

[51] Int. Cl.[7] .................................................. H05B 37/02
[52] U.S. Cl. ....................... 315/224; 315/244; 315/205; 315/209 R; 315/307
[58] Field of Search .................................. 315/224, 244, 315/205, 209 R, 291, 307, 247, DIG. 7; 363/40, 44, 126, 131

[56] References Cited

U.S. PATENT DOCUMENTS

| | | | |
|---|---|---|---|
| 3,808,481 | 4/1974 | Rippel | 318/139 |
| 3,866,099 | 2/1975 | Bourbeau | 318/254 |
| 4,115,729 | 9/1978 | Young et al. | 322/86 |
| 4,164,785 | 8/1979 | Young et al. | 363/50 |
| 4,270,164 | 5/1981 | Wyman et al. | 363/56 |
| 4,415,839 | 11/1983 | Lesea | 315/308 |
| 4,423,363 | 12/1983 | Clark et al. | 318/375 |
| 4,480,298 | 10/1984 | Fry | 307/31 |
| 4,489,373 | 12/1984 | du Parc | 363/56 |
| 4,507,698 | 3/1985 | Nilssen | 361/42 |
| 4,525,648 | 6/1985 | De Bijl et al. | 315/224 |
| 4,572,988 | 2/1986 | Handler et al. | 315/209 |
| 4,608,958 | 9/1986 | Sakakibara et al. | 123/605 |
| 4,618,810 | 10/1986 | Hagerman et al. | 318/803 |
| 4,624,334 | 11/1986 | Kelledes et al. | 180/79.1 |
| 4,675,576 | 6/1987 | Nilssen | 315/242 |
| 4,682,083 | 7/1987 | Alley | 315/307 |
| 4,684,851 | 8/1987 | Van Meurs | 315/224 |
| 4,712,045 | 12/1987 | Van Meurs | 315/224 |
| 4,783,728 | 11/1988 | Hoffman | 363/37 |
| 4,818,917 | 4/1989 | Vest | 315/171 |
| 4,864,486 | 9/1989 | Spreen | 363/126 |
| 4,866,586 | 9/1989 | Suko | 363/5 |
| 4,870,327 | 9/1989 | Jorgensen | 315/307 |
| 4,899,382 | 2/1990 | Gartner | 379/413 |
| 4,952,853 | 8/1990 | Archer | 318/254 |
| 4,991,051 | 2/1991 | Hung | 361/57 |
| 5,003,231 | 3/1991 | Perper | 315/291 |
| 5,004,955 | 4/1991 | Nilssen | 315/119 |
| 5,014,305 | 5/1991 | Moisin | 379/402 |
| 5,027,032 | 6/1991 | Nilssen | 315/103 |
| 5,052,039 | 9/1991 | Moisin | 379/402 |
| 5,063,339 | 11/1991 | Orii et al. | 318/696 |
| 5,081,401 | 1/1992 | Moisin | 315/324 |
| 5,124,619 | 6/1992 | Moisin et al. | 315/219 |
| 5,138,233 | 8/1992 | Moisin et al. | 315/187 |
| 5,138,234 | 8/1992 | Moisin | 315/209 |
| 5,138,236 | 8/1992 | Bobel et al. | 315/209 |

(List continued on next page.)

FOREIGN PATENT DOCUMENTS

| | | |
|---|---|---|
| 0460641 | 12/1991 | European Pat. Off. . |
| 0522266 | 1/1993 | European Pat. Off. . |
| 4010435 | 1/1991 | Germany . |
| 4032664 | 4/1992 | Germany . |
| 63-002464 | 11/1988 | Japan . |
| 2204455 | 11/1988 | United Kingdom . |
| 9422209 | 9/1994 | WIPO . |
| 9535646 | 12/1995 | WIPO . |

*Primary Examiner*—Haissa Philogene
*Attorney, Agent, or Firm*—Nutter, McClennen & Fish, LLP

[57] ABSTRACT

A circuit for energizing a load includes an inverter which provides a feedback signal to a rectifier for substantially linear operation of the rectifying diodes. In one embodiment, a ballast includes a rectifier and a resonant inverter which energizes a lamp. The inverter generates a current that is split between a first path which includes the lamp and a second path which includes a feedback capacitor. A feedback path, which includes a feedback inductor, extends from the feedback capacitor to a point between the rectifying diodes. The feedback capacitor and feedback inductor resonate in series to provide a reactive feedback signal for achieving substantially linear operation of the diodes. In another embodiment, the lamp current flows to a clamp circuit for limiting the lamp current to a predetermined level.

20 Claims, 7 Drawing Sheets

U.S. PATENT DOCUMENTS

| | | | |
|---|---|---|---|
| 5,144,195 | 9/1992 | Konopka et al. | 315/94 |
| 5,148,087 | 9/1992 | Moisin et al. | 315/291 |
| 5,173,643 | 12/1992 | Sullivan et al. | 315/276 |
| 5,177,408 | 1/1993 | Marques | 315/291 |
| 5,191,263 | 3/1993 | Konopka | 315/209 |
| 5,216,332 | 6/1993 | Nilssen | 315/224 |
| 5,220,247 | 6/1993 | Moisin | 315/209 |
| 5,223,767 | 6/1993 | Kulka | 315/209 R |
| 5,256,939 | 10/1993 | Nilssen | 315/244 |
| 5,291,382 | 3/1994 | Cohen | 363/56 |
| 5,309,066 | 5/1994 | Ditlevsen | 315/205 |
| 5,313,143 | 5/1994 | Vila-Masot et al. | 315/209 R |
| 5,315,533 | 5/1994 | Stich et al. | 364/480 |
| 5,332,951 | 7/1994 | Turner et al. | 315/209 |
| 5,334,912 | 8/1994 | Counts | 315/119 |
| 5,387,848 | 2/1995 | Wong | 315/224 |
| 5,390,231 | 2/1995 | Hung et al. | 379/2 |
| 5,399,943 | 3/1995 | Chandrasekaran | 315/219 |
| 5,416,388 | 5/1995 | Shackle | 315/219 |
| 5,432,817 | 7/1995 | Hormel et al. | 375/257 |
| 5,434,477 | 7/1995 | Crouse et al. | 315/209 |
| 5,434,480 | 7/1995 | Bobel | 315/224 |
| 5,444,333 | 8/1995 | Lau | 315/94 |
| 5,446,365 | 8/1995 | Nomura et al. | 320/14 |
| 5,481,160 | 1/1996 | Nilssen | 315/209 R |
| 5,493,180 | 2/1996 | Bezdon et al. | 315/91 |
| 5,504,398 | 4/1996 | Rothenbuhler | 315/209 |
| 5,515,433 | 5/1996 | Chen | 379/398 |
| 5,563,479 | 10/1996 | Suzuki | 318/139 |
| 5,574,335 | 11/1996 | Sun | 315/119 |
| 5,579,197 | 11/1996 | Mengelt et al. | 361/93 |
| 5,583,402 | 12/1996 | Moisin et al. | 315/307 |
| 5,608,295 | 3/1997 | Moisin | 315/247 |
| 5,608,595 | 3/1997 | Gourab et al. | 361/79 |
| 5,638,266 | 6/1997 | Horie et al. | 363/132 |
| 5,684,683 | 11/1997 | Divan et al. | 33/65 |
| 5,686,799 | 11/1997 | Moisin et al. | 315/307 |
| 5,691,606 | 11/1997 | Moisin et al. | 315/307 |
| 5,798,617 | 8/1998 | Moisin | 315/247 |
| 5,825,136 | 10/1998 | Rudolph | 315/291 |
| 5,831,396 | 11/1998 | Rudolph | 315/307 |
| 5,866,993 | 2/1999 | Moisin | 315/307 |
| 5,925,986 | 7/1999 | Moisin | 315/247 |

BALLAST HAVING A REACTIVE FEEDBACK CIRCUIT

CROSS REFERENCE TO RELATED APPLICATIONS

The present application is a continuation-in-part of U.S. patent application Ser. No. 09/102,789, filed on Jun. 23, 1998.

STATEMENT REGARDING FEDERALLY-SPONSORED RESEARCH

Not Applicable.

FIELD OF THE INVENTION

The present invention relates to circuits for energizing a load and more particularly to circuits having a rectifier with linear operation of the rectifying diodes.

BACKGROUND OF THE INVENTION

There are many types of circuits for providing power to a load. One type of circuit is a rectifier circuit for receiving an alternating current (AC) signal and providing a direct current (DC) output signal. In one application, a ballast circuit for energizing a fluorescent lamp includes a rectifier circuit having an input coupled to an AC power source and a DC output coupled to an inverter circuit. The inverter circuit applies an AC signal to the lamp that is effective to cause a predetermined level of current to flow through the lamp and thereby produce visible light.

Rectifier circuits generally contain one or more rectifying diodes coupled so as to form the input (AC) side and the output (DC) side of the rectifier. Each of the rectifying diodes is conductive for a part of the AC input signal. For example, a first rectifying diode may be conductive for a part of the positive portion of the AC input signal and a second rectifying diode may be conductive for a part of the negative portion. One problem associated with this arrangement is that the diodes which form the rectifier circuit are not operated in a linear manner. Typically, the rectifying diodes are only forward biased, i.e., conductive, when the AC input signal is at or near its peak value. The non-linear operation of the rectifying diodes has a negative impact on the efficiency of the circuit since only a limited amount of power from the AC power source is available to the circuit. Further, the total harmonic distortion (THD) and the Power Factor (PF) of the circuit are also adversely affected.

It would, therefore, be desirable to provide a circuit including a rectifier circuit having rectifying diodes that are operated in a substantially linear manner.

SUMMARY OF THE INVENTION

The present invention provides a circuit including a rectifier having rectifying diodes that operate in a substantially linear manner. Although the circuit is primarily shown and described in conjunction with a ballast circuit having a rectifier circuit coupled to an inverter circuit, it is understood that the circuit is applicable to other circuits and loads, such as power supplies and DC motors.

The circuit includes a rectifier having rectifying diodes with a feedback signal coupled to at least one of the rectifying diodes for providing substantially linear diode operation. In general, the relatively high frequency feedback signal comprises a voltage generated by a series resonance between an inductive element and a capacitive element which form a part of the circuit. The feedback signal is effective to periodically bias at least one of the rectifying diodes to a conductive state over substantially the entire AC input waveform. More particularly, a first rectifying diode transitions between a conductive and non-conductive state many times during a positive portion of the relatively low frequency AC input signal. And a second rectifying diode transitions to a conductive state many times during a negative portion of the AC input cycle. The linear operation of the rectifying diodes improves the power factor of the circuit and reduces the total harmonic distortion as compared with non-linear diode operation.

In one embodiment, a ballast circuit includes a rectifier which receives a relatively low frequency AC input signal and provides a DC signal to an inverter circuit. The inverter circuit applies a relatively high frequency AC signal to a lamp for causing a predetermined amount of current to flow through the lamp and thereby emit visible light. In an exemplary embodiment, the rectifier has a voltage doubler configuration including first and second rectifying diodes. The inverter circuit includes first and second switching elements coupled in a half bridge configuration connected to a resonant inductive element which is coupled to the lamp. A second inductive element, which is inductively coupled with the first inductive element, is coupled to a ballast capacitor.

The ballast capacitor and the first and second inductive elements resonate in series such that the respective voltages across the ballast capacitor and the second inductive element combine to provide a feedback signal that is effective to periodically bias a respective one of the first and second rectifying diodes to a conductive state. The first rectifying diode transitions between a conductive and non-conductive state when the input AC signal is positive and the second rectifying diode transitions between the conductive and non-conductive state when the input AC signal is negative. The frequency associated with transitions of the rectifying diodes between conductive and non-conductive states corresponds to a frequency of the AC signal that is applied to the lamp. Thus, a respective one of the first and second rectifying diodes is periodically biased to a conductive state over substantially the entire AC input signal to provide substantially linear diode operation.

In another embodiment, a ballast circuit includes a rectifier having a voltage doubler configuration coupled to an inverter circuit for energizing a lamp. The inverter circuit has a full bridge topology formed from first and second switching elements and first and second bridge diodes. Coupled to the bridge are first and second inductive elements which are adapted for connection to the lamp. The inverter further includes a ballast capacitor and a third inductive element which is inductively coupled to the first and second inductive elements.

In operation, the first switching element is conductive as current flows in a first direction through the lamp and the second inductive element. The second switching element is conductive as current flows in a second, opposite direction through the lamp and the first inductive element. The ballast capacitor resonates in series with the first and second inductive elements and a corresponding voltage is induced in the third inductive element. The voltages across the ballast capacitor and the third inductive element combine to provide a feedback signal to the rectifying diodes that is effective to periodically bias a respective one of the first and second rectifying diodes to a conductive state.

In a further embodiment, the inverter circuit has a full bridge topology and the rectifier is a full bridge rectifier including four rectifying diodes with first and second capacitors coupled end to end across AC input terminals of the rectifier. A feedback signal from the inverter is coupled to a point between the first and second capacitors. The feedback signal periodically biases a respective pair of the rectifying diodes to a conductive state to provide substantially linear operation of the four rectifying diodes.

In yet another embodiment, a ballast circuit includes an inverter which provides a reactive feedback signal to the rectifying diodes in a rectifier for achieving substantially linear diode operation. In one embodiment, the rectifier includes first and second rectifying diodes coupled end to end across the rectifier input terminals. The inverter generates a current through a resonant inductive element which splits between a first path, which includes the lamp, and a second path, which includes a feedback capacitor. A feedback path, which includes a feedback inductor, extends from the feedback capacitor to a point between the rectifying diodes. The feedback capacitor and the feedback inductor resonate in series to provide a feedback signal to the rectifying diodes for linear diode operation. In another embodiment, the ballast further includes a clamp circuit coupled to the lamp for limiting the lamp current to a predetermined level. By isolating the lamp current from the reactive current, the lamp current can be more accurately controlled.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
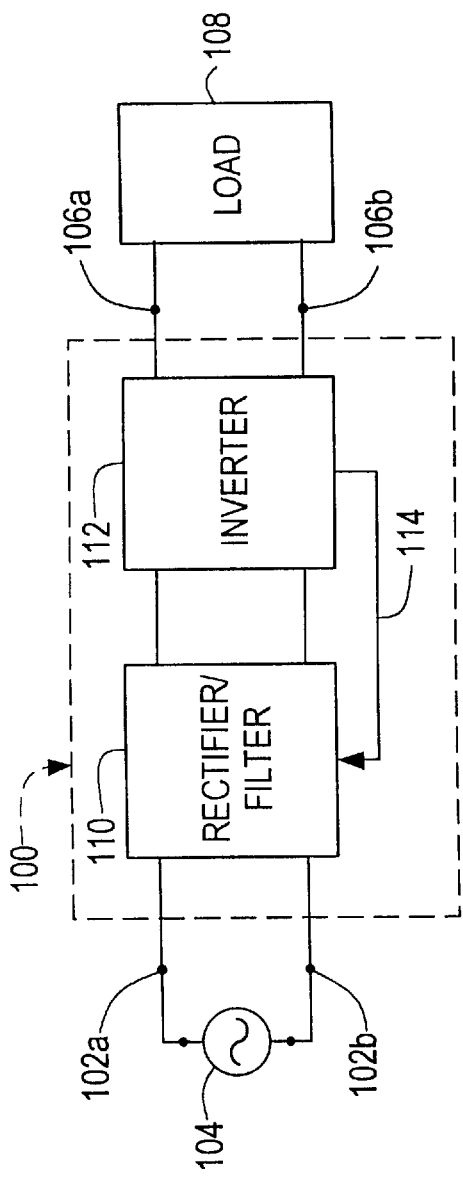
FIG. 1 is a schematic block diagram of a circuit in accordance with the present invention.

FIG. 1 shows an exemplary embodiment of a ballast circuit 100 in accordance with the present invention. The ballast circuit 100 includes first and second input terminals 102a,b coupled to an alternating current (AC) power source 104 and first and second output terminals 106a,b coupled to a load 108, such as a fluorescent lamp. The ballast circuit 100 has a rectifier/filter circuit 110 for receiving the AC signal from the power source 104 and providing a direct current (DC) signal to an inverter circuit 112. The inverter circuit 112 provides a feedback signal 114 to the rectifier circuit 110 for enhancing linear operation of the rectifier, as described below. The inverter circuit 112 energizes the lamp 108 with an AC signal that is effective to cause a current to flow through the lamp and thereby emit light.

Figure 2:
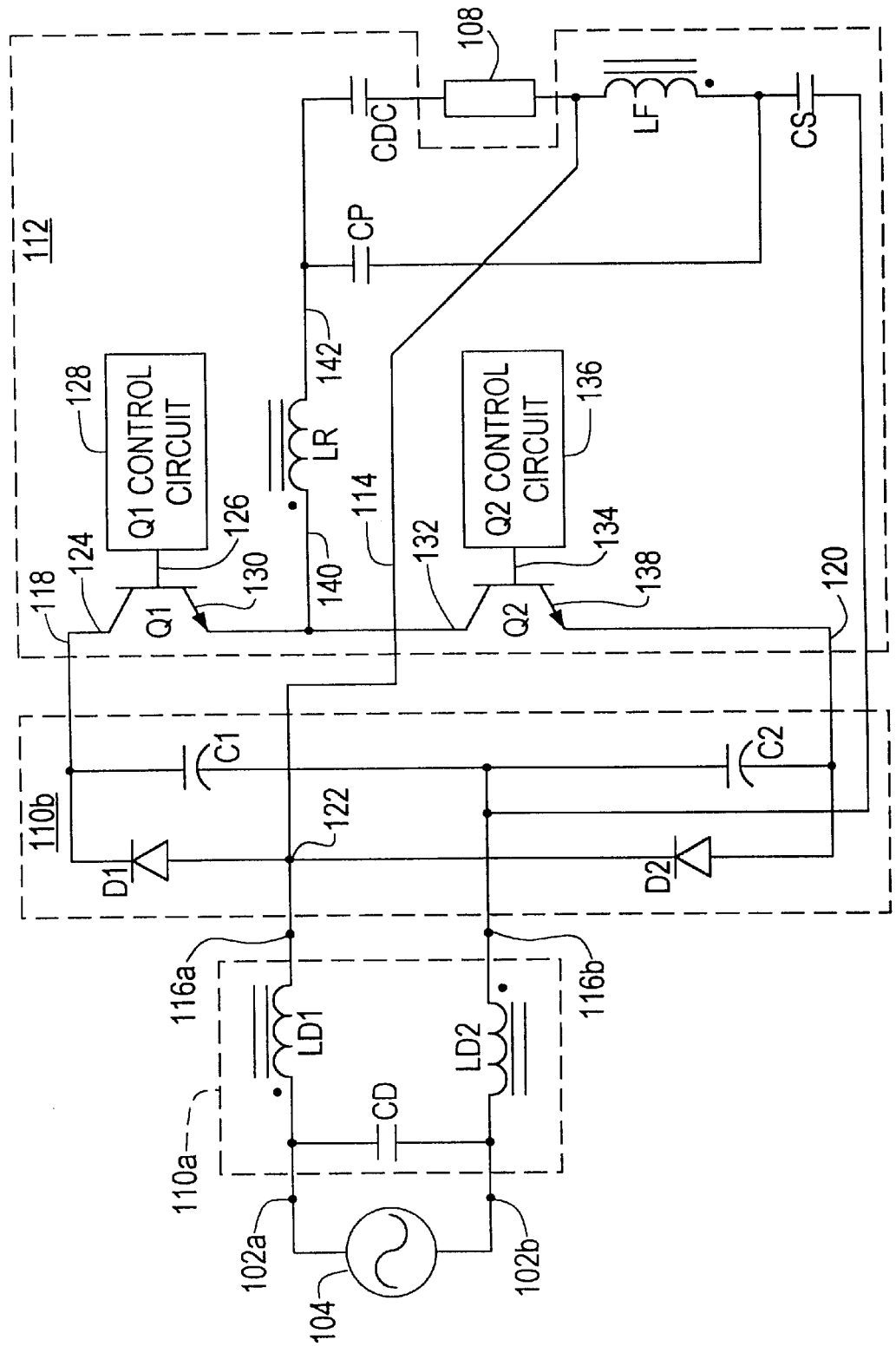
FIG. 2 is a circuit diagram of an exemplary embodiment of the circuit of FIG. 1.

FIG. 2 is an exemplary embodiment of the ballast circuit 100 of FIG. 1, wherein like reference designations indicate like elements. An electromagnetic interference (EMI) filter 110a has first and second input terminals 102a, 102b coupled to the AC energy source 104 and first and second output terminals 116a, 116b coupled to the rectifier circuit 110b. The EMI filter 110a includes a filter capacitor CD coupled across the filter input terminals 102a,b and inductively coupled first and second inductive elements LD1,LD2 coupled to opposite terminals of the capacitor CD.

The rectifier circuit 110b is configured as a so-called voltage doubler circuit formed from rectifying diodes D1,D2 and capacitors C1,C2. Voltage doubler circuits are well known to one of ordinary skill in the art. The diodes D1,D2 are coupled end to end across positive and negative rails 118,120 of the inverter 112. The capacitors C1,C2 are also coupled end to end across the positive and negative rails 118,120. The rectifier 110b further includes a feedback node 122 located at a point between the first and second diodes D1,D2. The feedback node 122 receives a feedback signal from the inverter 112 via a feedback path 114. The feedback signal is effective to provide substantially linear operation of the rectifying diodes D1,D2, as described below.

The inverter circuit 112 includes first and second switching elements Q1,Q2, shown here as transistors, coupled in a half bridge configuration between the positive and negative rails 118,120 of the inverter. It is understood by one of ordinary skill in the art that other types of switching elements can be used. In an exemplary embodiment, the first switching element Q1 includes a first or collector terminal 124 coupled to the positive rail 118, a second or base terminal 126 coupled to a first control circuit 128 for controlling the conduction state of the first switching element Q1, and a third or emitter terminal 130 coupled to the second switching element Q2. The second switching element Q2 has a collector terminal 132 coupled to the emitter terminal 130 of the first switching element Q1, a base terminal 134 coupled to a second control circuit 136 for controlling a conduction state of the second switching element Q2, and an emitter terminal 138 coupled to the negative rail 120 of the inverter.

A resonant inductive element LR has a first terminal 140 coupled to a point between the first and second switching elements Q1,Q2 and a second terminal 142 which is coupled to both a parallel capacitor CP and a DC-blocking capacitor CDC. The capacitor CDC, the lamp 108, an inductive feedback element LF, and a ballast capacitor CS are consecutively coupled between the inductive element LR and a point between the capacitors C1,C2 (AC ground). The parallel capacitor CP has one terminal coupled to a point between the inductive element LR and the capacitor CDC and the other terminal coupled to a point between the feedback element LF and the ballast capacitor CS. The feedback path 114 extends from a point between the lamp 108 and the feedback element LF to the feedback node 122, which is located between the rectifying diodes D1,D2.

The feedback element LF is inductively coupled with the inductive element LR with respective polarities indicated with conventional dot notation. As understood by one of ordinary skill in the art, the dot indicates a rise in voltage from the unmarked end to the marked end.

In operation, the rectifier 110b receives a relatively low frequency AC input signal from the AC energy source 104 and provides a DC signal to the inverter circuit 112 which energizes the lamp 108 with a relatively high frequency AC signal. The first rectifying diode D1 is conductive for a portion of a positive half of the AC input signal and the second diode D2 is conductive for a portion of a negative half of the AC signal. When the diodes D1,D2 are conductive, energy from the AC source 104 is transferred to the circuit. Voltages at the feedback element LF and the ballast capacitor CS combine to form the feedback signal that is provided to the rectifying diodes D1,D2 at the feedback node 122 via the feedback path 114.

The inverter 112 provides a relatively high frequency AC signal to the lamp 108 so as to cause a predetermined amount of current to flow through the lamp and thereby emit visible light. The inverter 112 has a characteristic resonant frequency which is determined by the impedance values of the various circuit elements, such as the inductive element LR, the capacitors CP,CS and the lamp 108. As the circuit resonates, current through the lamp 108 and the other circuit elements periodically reverses direction. In general, as current flows in a first direction from the inductive element LR to the lamp 108, the first switching element Q1 is conductive. And when the current reverses direction so as to flow from the lamp 108 to the inductive element LR, the second switching element Q2 is conductive. The first and second control circuits 128,136 control the conduction states of the respective first and second switching elements Q1,Q2 so as facilitate resonant operation of the circuit. Control circuits for controlling the switching elements Q1,Q2 are well known to one of ordinary skill in the art. Exemplary control circuits for controlling the switching elements Q1,Q2 are disclosed in U.S. Pat. No. 5,124,619 (Moisin et al.), U.S. Pat. No. 5,138,234 (Moisin), and U.S. Pat. No. 5,138,236 (Bobel et al.), all incorporated herein by reference.

Substantially linear operation of the rectifying diodes D1,D2 is achieved due to voltages at the capacitor CS and feedback element LF which combine to provide the feedback signal. As current flows through the resonant inductive element LR a voltage is induced at the inductively coupled feedback element LF. In addition, a local series resonance develops between the ballast capacitor CS and the inductive elements LF,LR. As known to one of ordinary skill in the art, a series resonant inductive-capacitive (LC) circuit appears as a short circuit. However, voltages across the inductive and capacitive elements can be relatively high. And due the phase relationship of the respective voltages across the capacitor CS and inductor LF, the voltages combine to apply a voltage at the feedback node 122 via the feedback path 114 that periodically biases one of the rectifying diodes D1,D2 to a conductive state.

Figure 3:
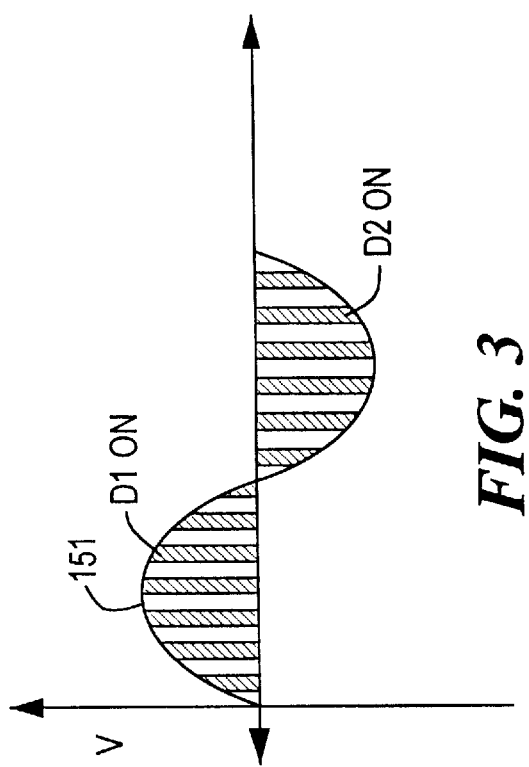
FIG. 3 is a graphical depiction of exemplary signals generated by the circuit of FIG. 1.

As shown in FIG. 3, the first diode D1 is periodically forward biased (ON) during a positive half cycle of the AC input signal 151 and the second diode D2 is periodically biased to a conductive state (ON) during a negative half cycle of the input signal. The first diode D1 transitions between the conductive and non-conductive states many times during each positive portion of the AC input signal. And similarly, the second diode D2 periodically conducts during the negative portion of the AC input signal. This reflects the relationship of the relatively high frequency AC signal applied to the lamp 108 and the relatively low frequency, e.g., 60 Hz, of the AC input signal provided by the AC source 104. It is understood that the graphical depiction of FIG. 3 is not intended to show any particular relationship between the respective frequencies of the signals but rather is intended to facilitate an understanding of the invention.

By causing the rectifying diodes D1,D2 to operate linearly, the total harmonic distortion (THD) is reduced and the power factor (PF) is improved. The circuit provides a THD of less than about twenty percent and a PF of greater than about ninety-five percent. And since the diodes conduct over substantially the entire AC input signal, more power comes directly from the power line instead of from a circuit element in which the energy had been stored.

Figure 4:
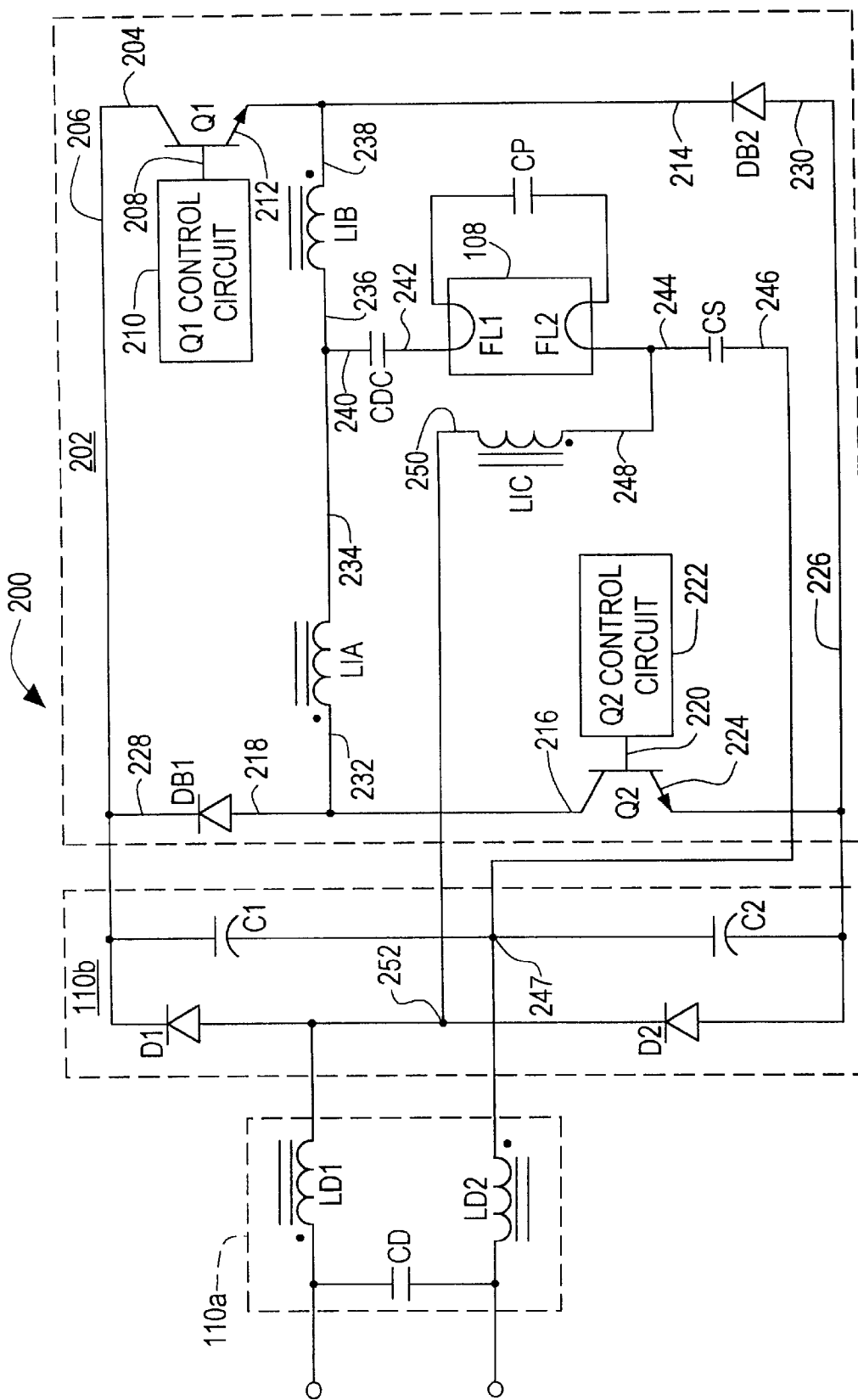
FIG. 4 is a circuit diagram of another embodiment of the circuit of FIG. 1.

FIG. 4 shows another embodiment of a ballast circuit 200 having feedback in accordance with the present invention. The ballast circuit 200 includes an EMI filter 110a and a rectifier 110b like that shown in FIG. 2. The ballast circuit 200 includes an inverter circuit 202 having a full bridge topology with first and second switching elements Q1,Q2, first and second bridge diodes DB1,DB2, and first and second inductively coupled inductive elements L1A,L1B. The first switching element Q1, shown as a transistor, has a collector terminal 204 coupled to a positive rail 206 of the inverter, a base terminal 208 coupled to a first control circuit 210, and an emitter terminal 212 coupled to a cathode 214 of the second diode DB2. The second switching element Q2, also shown as a transistor, has a collector terminal 216 coupled to an anode 218 of the first diode DB1, a base terminal 220 coupled to a second control circuit 222, and an emitter terminal 224 coupled to a negative rail 226 of the inverter. A cathode 228 of the first bridge diode DB1 is connected to the positive rail 206 of the inverter and an anode 230 of the second bridge diode DB2 is connected to the negative rail 226.

The first inductive element L1A has a first terminal 232 coupled to a point between the first bridge diode DB1 and the second switching element Q2 and a second terminal 234 coupled to a first terminal 236 of the second inductive element L1B. A second terminal 238 of the second inductive element L1B is coupled to a point between the first switching element Q1 and the second bridge diode D2. A DC-blocking capacitor CDC is coupled at a first terminal 240 to a point between the first and second inductive elements L1A,L1B and at a second terminal 242 to a first lamp filament FL1. The parallel capacitor CP is coupled across the first lamp filament F11 and a second lamp filament FL2. A ballast capacitor CS has a first terminal 244 coupled to the second filament FL2 and a second terminal 246 coupled to a point 247 between the capacitors C1,C2, which is AC ground. A feedback inductive element L1C has a first terminal 248 coupled to a point between the ballast capacitor CS and the second lamp filament FL2 and a second terminal 250 coupled to a feedback node 252 located between the first and second rectifying diodes D1,D2. The feedback inductive element L1C is inductively coupled with the first and second inductive elements L1A,L1B with a polarity as indicated with dot notation.

Resonant operation of the full bridge circuit is described in co-pending and commonly assigned U.S. patent application Ser. No. 08/948,690, filed on Oct. 10, 1997, and entitled Converter/Inverter Full Bridge Ballast Circuit. In general, the first and second switching elements Q1,Q2 are alternately conductive as current periodically switches direction. The bridge diodes DB1,DB2 provide a discharge path during the time when both the first and second switching elements are OFF, i.e., the dead time.

Looking at the time when the first switching element Q1 is ON, current flows from the transistor Q1, through the second inductive element L1B, the capacitor CDC, the lamp 108, and the ballast capacitor CS to AC ground 247. As the current flows, the second inductive element L1B and the ballast capacitor CS begin to resonate in a local LC series resonance. As described above, relatively high voltages can appear at the capacitive and inductive elements due to the resonance. The voltage at the second inductive element L1B induces a corresponding voltage at the inductively coupled feedback inductive element L1C. And due to the phase relationship of the voltages at the ballast capacitor CS and the inductive feedback element L1C, the voltages combine to provide a voltage at the feedback node 252 that is effective to periodically bias the second rectifying diode D2 to a conductive state.

When the current flows in the opposite direction as the second switching element Q2 is conductive, the polarity of the voltage at the feedback inductive element L1C switches since now current flows from the lamp 108 to the first inductive element L1A. The voltages at the ballast capacitor CS and the feedback element L1C combine to periodically bias the first rectifying diode D1 to the conductive state. Referring again to FIG. 3, one of the rectifying diodes D1,D2 is periodically ON over the entire low frequency AC input waveform to provide linear diode operation.

Figure 5:
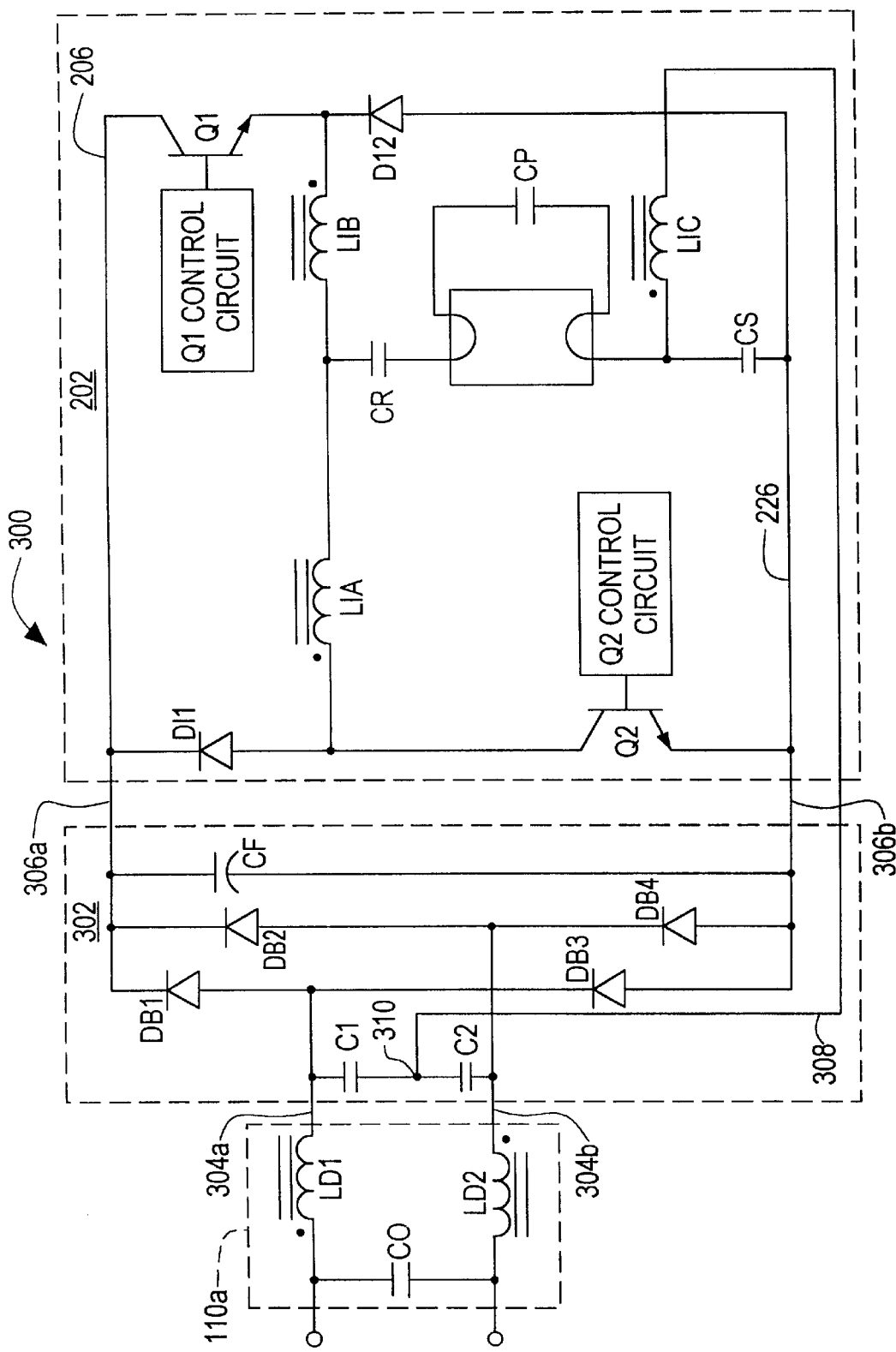
FIG. 5 is a circuit diagram of a further embodiment of the circuit of FIG. 1.

FIG. 5 shows a further embodiment of a ballast circuit 300 in accordance with the present invention. The ballast circuit 300 includes an EMI filter 110a like that shown in FIG. 2 and a full bridge inverter circuit 202 like that shown in FIG. 4. Coupled to the EMI filter 110a is a rectifier circuit 302 having first and second capacitors C1,C2 coupled end to end across first and second AC input terminals 304a,304b of the rectifier 302. The rectifier circuit 302 further includes rectifying diodes D1–D4 coupled in a full bridge configuration forming first and second DC output terminals 306a,306b which are coupled to the positive and negative rails 206,226, respectively, of the inverter 202.

A feedback path 308 from the ballast capacitor CS and the feedback inductive element L1C is coupled to a feedback node 310 located between the first and second capacitors C1,C2, which is AC ground.

As described above in conjunction with FIG. 4, the first and second inductive elements L1A, L1B and the ballast capacitor CS resonate in series such that a relatively high voltage appears across the feedback element L1C. The voltages at the ballast capacitor CS and the feedback element L1C combine to provide a feedback signal that is effective to periodically bias one or more of the rectifying diodes D1–D4 to a conductive state and thereby provide substantially linear diode operation. More particularly, during a positive portion of the AC input signal, the first and fourth rectifying diodes D1,D4 repeatedly transition between a conductive and non-conductive state. Similarly, the second and third rectifier diodes D2,D3 periodically conduct during the negative portion of the AC input signal.

Figure 6:
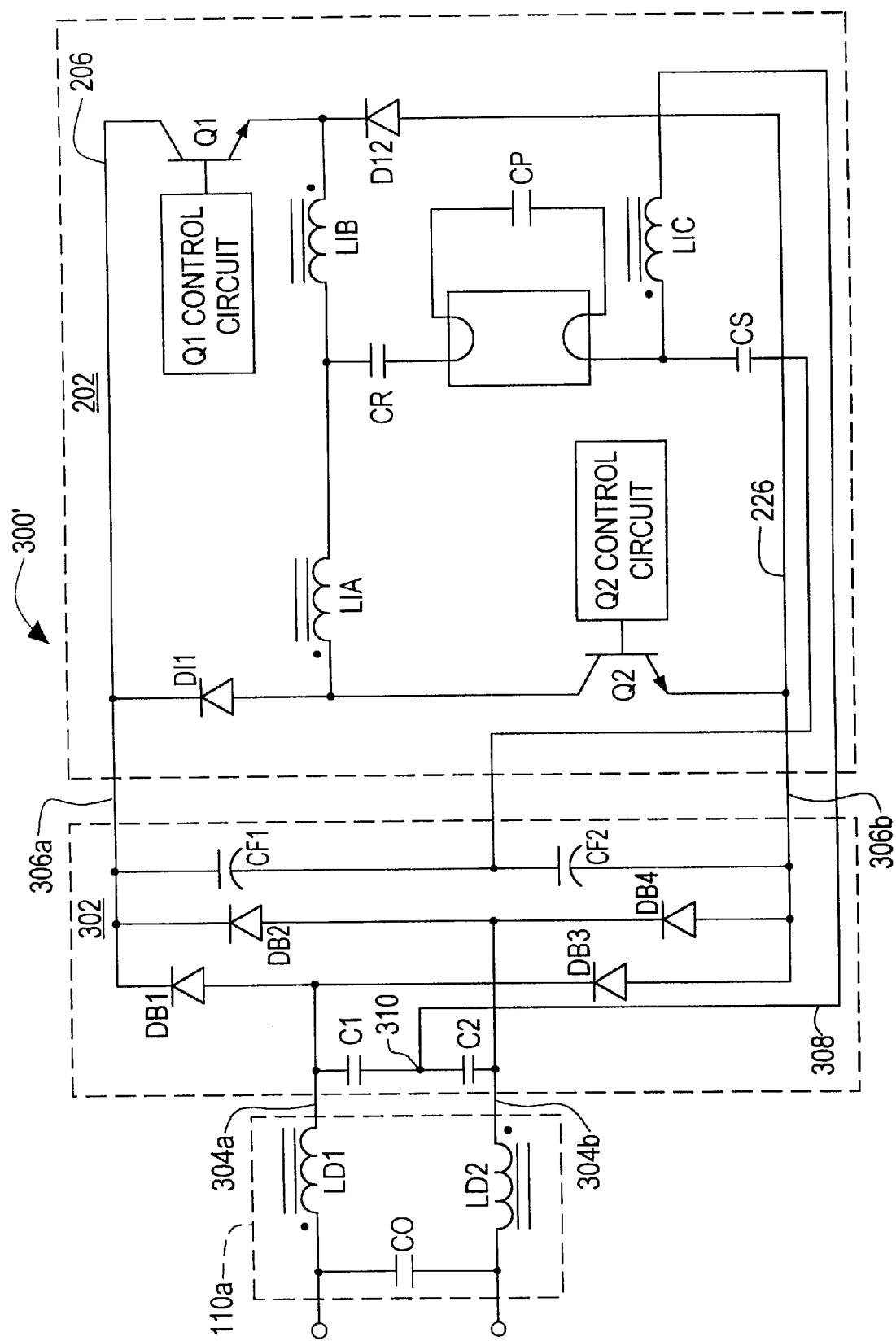
FIG. 6 is a circuit diagram of a still further embodiment of the circuit of FIG. 1.

FIG. 6 shows a ballast circuit 300' like that shown in FIG. 5 with a second capacitor CF2 coupled end to end with the first capacitor CF1 between the output terminals 306 of the rectifier 302. A circuit path extends from the ballast capacitor CS to a point between the capacitors CF1,CF2 (AC ground).

Figure 7:
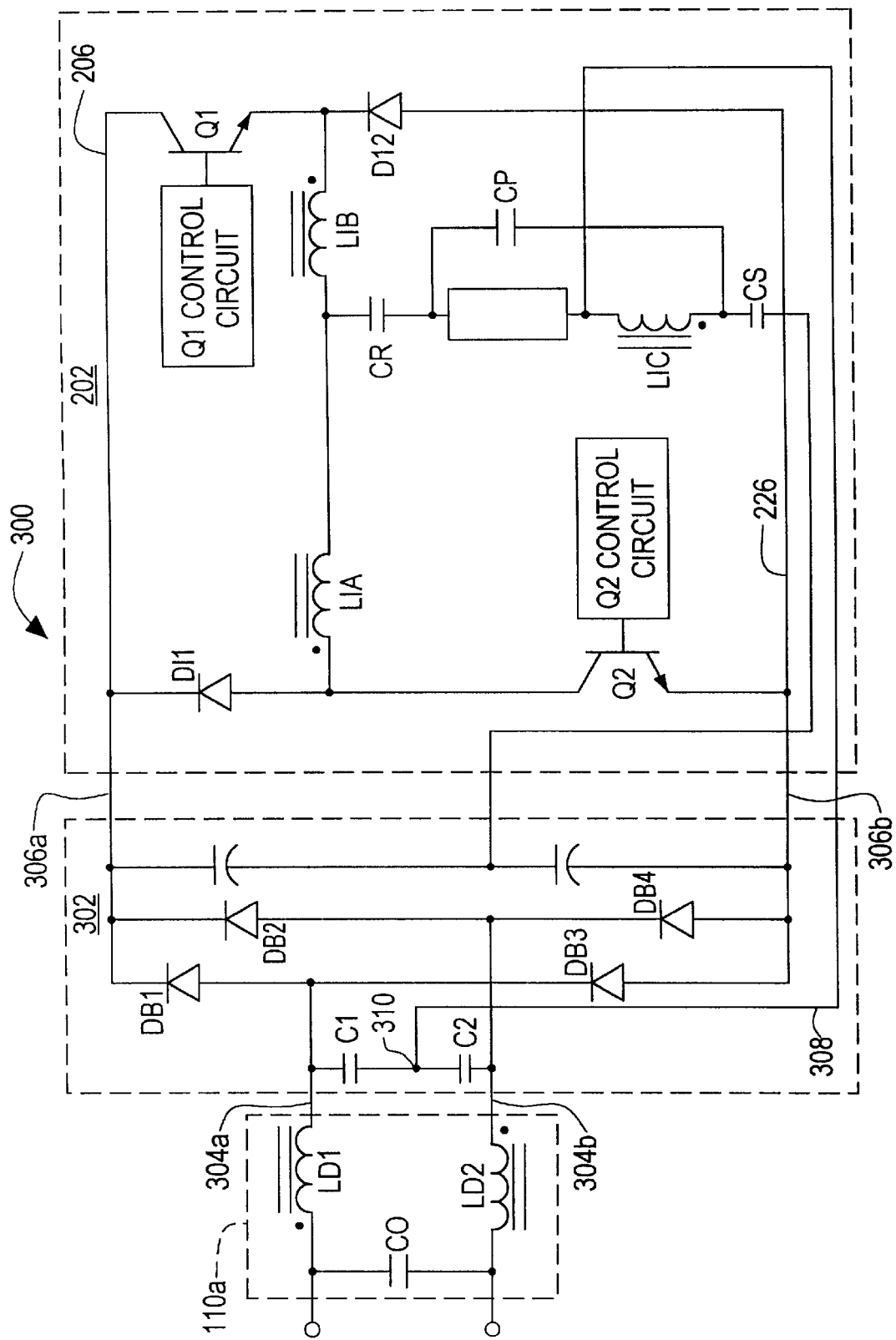
FIG. 7 is a circuit diagram of another embodiment of the circuit of FIG. 1.

FIG. 7 shows a ballast circuit 300" like that shown in FIG. 5 with the feedback element L1C coupled between the lamp and the ballast capacitor CS. As described above in conjunction with FIGS. 2 and 4, the ballast capacitor CS and the inductive elements L1A,L1B,L1C resonate in series so as to generate a voltage that is sufficient to bias the rectifying diodes into substantially linear diode operation.

Figure 8:
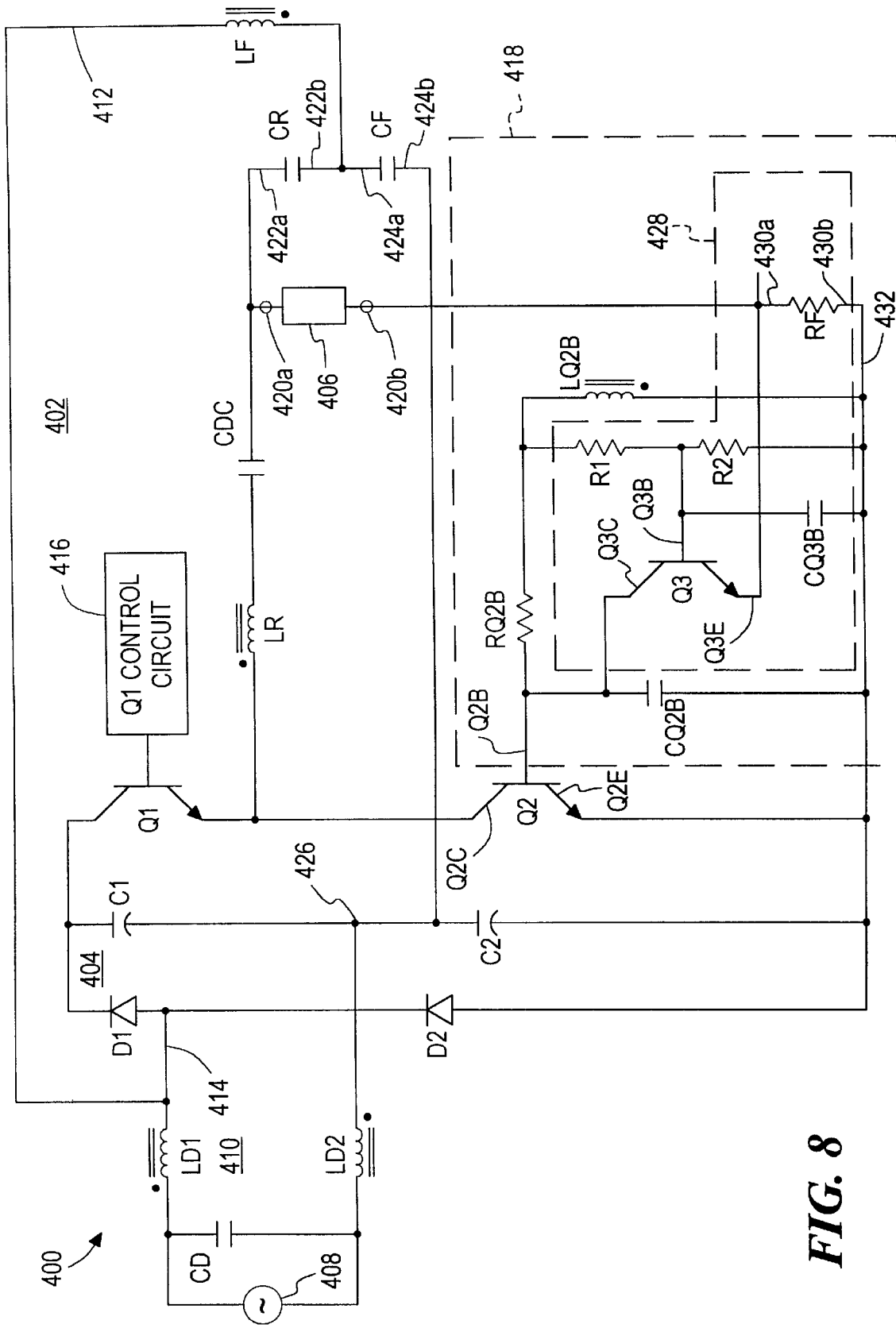
FIG. 8 is a circuit diagram of yet another embodiment of a circuit in accordance with the present invention.

FIG. 8 shows a ballast circuit 400 having an inverter 402 which provides a feedback signal to a voltage doubling rectifier 404. Current through the lamp 406 is clamped to a predetermined level and reactive current through a resonant circuit element provides the feedback signal to the rectifier 404 for providing linear operation of the rectifying diodes D1,D2.

In one embodiment, an AC input signal provided by an AC energy source 408 is received by a EMI filter 410 formed from inductive elements LD1,LD2 and capacitor CD. The filtered AC input signal is rectified by the voltage doubling rectifier circuit 404 which is formed from first and second bridge diodes D1,D2 and capacitors C1,C2. A feedback signal path 412 extends from the inverter 402 to a point 414 between the first and second rectifying bridge diodes D1,D2 of the rectifier.

The inverter 402 includes first and second switching elements Q1,Q2 coupled in a half bridge configuration with a first control circuit 416 controlling a conduction state of the first switching element Q1 and a second control circuit 418 controlling a conduction state of the second switching element Q2. A resonant inductive element LR has one terminal coupled to a point between the first and second switching elements Q1,Q2 and the other terminal coupled to a DC-blocking capacitor CDC. A first lamp terminal 420a is coupled to the DC-blocking capacitor CDC and a second lamp terminal 420b is coupled to the second control circuit 418. A resonant capacitor CR has a first terminal 422a coupled to the first lamp terminal 420a and a second terminal 422b coupled to a first terminal 424a of a feedback capacitor CF. A second terminal 424b of the feedback capacitor CF is coupled to a point 426 between the first and second capacitors C1,C2.

The feedback signal path 412 extends from a point between the resonant capacitor CR and the feedback capacitor CF to the point 414 between the first and second bridge diodes D1,D2. The feedback signal path 412 includes a feedback inductor LF which is inductively coupled with the resonant inductive element LR. The polarity of the feedback inductor LF with respect to the resonant inductive element LR is indicated with conventional dot notation.

The second control circuit 418 includes an inductive bias element LQ3B for alternately biasing the second switching element Q2 to conductive and non-conductive states and a clamping circuit 428 for limiting the lamp current to a predetermined level. The inductive bias element LQ3B, a resistor RQ2B, and a capacitor CQ2B combine to control the conduction state of the second switching element Q2 to facilitate resonant operation of the inverter. More particularly, the bias element LQ3B, which is inductively coupled to the resonant inductive element LR, alternately biases the second switching element Q2 to conductive and nonconductive states based on the direction of the current through the resonant inductive element LR. The use of an inductive bias element that is inductively coupled to a resonant inductive element is well known to one of ordinary skill in the art.

The clamping circuit 428 includes a feedback resistor RF having a first terminal 430a coupled to the lamp 406 and a second terminal 430b coupled to a negative rail 432 of the inverter. A third switching element Q3, shown as a transistor, has a collector terminal Q3C coupled to the base terminal Q2B of the second switching element Q2, a base terminal Q3B coupled to the negative rail 432 via a capacitor CQ3B, and an emitter terminal Q3E coupled to a point between the feedback resistor RF and the lamp 406. A first resistor R1 is coupled between the base terminal Q3B of the third switching element Q3 and the inductive feedback element LQ2B and a second resistor R2 is coupled between the base terminal Q3B of the third switching element Q3 and the negative rail 432 of the inverter.

In operation, current through the resonant inductive element LR splits between the lamp 406 (lamp current) and the capacitors CR,CF (reactive current). A series resonance develops between the feedback inductive element LF and feedback capacitor CF so as to generate relatively high voltages across these elements. Since the voltages are out of phase with respect to each other, the voltages across the feedback capacitor CF and the inductive feedback element LF combine to provide a feedback signal which produces linear operation of the rectifier bridge diodes D1,D2.

The lamp current flows from the negative rail 432 through the feedback resistor RF. When the current level through the feedback resistor RF becomes greater than a predetermined level, the third switching element Q3 is biased to a conductive state which causes the second switching element Q2 to transition to a non-conductive state. More particularly, the current flowing from the negative rail 432 to the lamp 406 generates a voltage drop across the feedback resistor RF that negatively biases the emitter terminal Q3E of Q3. When the negative bias is sufficient to overcome the base to emitter voltage of Q3 (about 0.7 volts), the transistor Q3 becomes conductive. The lamp current is thereby clamped to a predetermined level.

By providing separate paths for the reactive current and the lamp current, the lamp current can be isolated for limiting the lamp current to a predetermined level without inaccuracies associated with the reactive current signal. And the reactive current is provided to the rectifying diodes for achieving substantially linear operation of the diodes.

It is understood that the lamp current can be isolated and that the reactive current can be coupled to the rectifier in other circuit topologies as well, such as full bridge inverter configurations and single switching element inverters, like that shown in co-pending and commonly assigned U.S. patent application Ser. No. 09/146,859, filed on Sep. 3, 1998.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A circuit for energizing a load, comprising:
    a rectifier for receiving an AC input signal and providing a DC output signal, the rectifier including a first rectifying diode;
    a resonant inverter for receiving the DC output signal and providing an AC drive signal to the load, the resonant inverter including
        a first current path through which current to the load flows; and
        a second current path through which reactive current flows, the second current path including a feedback capacitor; and
    a feedback signal path extending from the feedback capacitor to the first rectifying diode, the feedback signal path including a feedback inductor, wherein the feedback capacitor and the feedback inductor resonate in series such that resultant voltages on the feedback capacitor and the feedback inductor combine to provide a feedback signal on the feedback signal path for linear operation of the first rectifying diode.

2. The circuit according to claim 1, further including a second rectifying diode coupled end to end with the first rectifying diode, wherein the feedback signal path extends from a point between the first and second rectifying diodes.

3. The circuit according to claim 2, wherein the rectifier is a voltage doubling rectifier including first and second capacitors coupled end to end.

4. The circuit according to claim 3, wherein the feedback capacitor is coupled to a point between the first and second capacitors.

5. The circuit according to claim 1, wherein the resonant inverter includes a resonant inductor and a first switching element having a conduction state controlled by a first control circuit and the resonant inductor, wherein a first series circuit path includes the resonant inductor, the load when coupled in circuit, and the first control circuit.

6. The circuit according to claim 5, further including a resonant capacitor, such that the resonant inductor, the resonant capacitor and the feedback capacitor provide a second series circuit path.

7. The circuit according to claim 1, wherein the first control circuit further includes a clamp circuit for limiting the load current to a predetermined level.

8. The circuit according to claim 7, wherein the clamp circuit includes a feedback resistor coupled between the load and a negative rail of the inverter.

9. The circuit according to claim 8, wherein the clamp circuit further includes a clamp switching element coupled to the first switching element and to the feedback resistor such that load current greater than the predetermined level biases the clamp switching element to a state which transitions the first switching element to a non-conductive state.

10. The circuit according to claim 9, wherein the first control circuit includes an inductive bias element for alternately biasing the first switching element to conductive and non-conductive states, the bias element being inductively coupled with the resonant inductive element.

11. The circuit according to claim 10, wherein the clamp switching element is a transistor having a first terminal coupled to the first switching element, a second terminal coupled to the bias element, and a third terminal coupled to the feedback resistor.

12. A ballast circuit for energizing a lamp, comprising:
    a rectifier circuit including first and second rectifying diodes;
    an inverter coupled to the rectifier for providing an AC drive signal to the lamp, the inverter including
        first and second switching elements for providing resonant operation of the inverter;
        a first control circuit for controlling a conduction state of the first switching element;
        a second control circuit for controlling a conduction state of the second switching element;
        a resonant inductive element having a first terminal coupled to a point between the first and second switching elements and a second terminal coupled to a first lamp terminal;
        a resonant capacitor having a first terminal coupled to the first lamp terminal and a second terminal; and
        a feedback capacitor having a first terminal coupled to the second terminal of the resonant capacitor and a second terminal coupled to the rectifier; and
    a feedback signal path for carrying a feedback signal extending from a point between the resonant capacitor and the feedback capacitor to a point between the first and second rectifying diodes, the feedback signal path including a feedback inductor such that the feedback inductor and the feedback capacitor resonate in series and a voltage on the feedback inductor and a voltage on the feedback capacitor combine to provide the feedback signal for linear operation of the first and second rectifying diodes.

13. The ballast according to claim 12, wherein the second control circuit further includes a clamp circuit coupled to a second lamp terminal for limiting the lamp current to a predetermined level.

14. The ballast according to claim 13, wherein the clamp circuit includes a feedback resistor coupled between the second lamp terminal and a negative rail of the inverter.

15. The ballast according to claim 14, wherein the clamp circuit further includes a third switching element having a first state which corresponds to the second switching element being in a conductive state and a second state which corresponds to the second switching element being in a non-conductive state.

16. The ballast according to claim 15, wherein the third switching element is biased to the second state when the lamp current becomes greater than a predetermined level.

17. The ballast according to claim 16, wherein the third switching element is a transistor having an emitter terminal coupled to the feedback resistor.

18. A method for providing linear operation of rectifying diodes, comprising:

splitting a current between a first path which includes a load and a second path which includes a feedback capacitor;

coupling the second path to the rectifying diodes via a feedback path which includes a feedback inductor such that a series resonance between the feedback capacitor and the feedback inductor generates a signal that periodically biases the rectifying diodes to a conductive state.

19. The method according to claim 18, wherein the load is a lamp which is energized by a resonant inverter.

20. The method according to claim 18, further including coupling the first path to a clamp circuit for limiting the load current to predetermined level.

* * * * *